(12) United States Patent
Tamai

(10) Patent No.: US 7,272,478 B2
(45) Date of Patent: Sep. 18, 2007

(54) CONTROL SYSTEM FOR ACTIVE ATTENUATION OF TORQUE-STEER VIA ELECTRIC POWER STEERING

(75) Inventor: Goro Tamai, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 151 days.

(21) Appl. No.: 10/375,562

(22) Filed: Feb. 26, 2003

(65) Prior Publication Data

US 2004/0167694 A1    Aug. 26, 2004

(51) Int. Cl.
*B62D 5/04*    (2006.01)

(52) U.S. Cl. .................. 701/41; 180/422; 180/444; 180/446

(58) Field of Classification Search .................. 701/29, 701/41, 42, 48, 69, 72, 36; 180/402, 412, 180/422, 177, 443, 446, 233, 421, 197, 444, 180/79.1; 475/18, 19, 84; 73/862.331; 318/432, 318/632, 611, 434, 471; 74/390
See application file for complete search history.

(56) References Cited

U.S. PATENT DOCUMENTS

| | | | |
|---|---|---|---|
| 4,509,611 A * | 4/1985 | Kade et al. .................. 180/446 |
| 5,040,629 A * | 8/1991 | Matsuoka et al. .......... 180/446 |
| 5,563,790 A * | 10/1996 | Wada et al. ................... 701/41 |
| 5,703,775 A * | 12/1997 | Yamamoto et al. ........... 701/41 |
| 6,000,488 A * | 12/1999 | Atkinson ..................... 180/248 |
| 6,032,755 A * | 3/2000 | Blandino et al. ........... 180/446 |
| 6,154,696 A * | 11/2000 | Nishi et al. ..................... 701/41 |
| 6,360,153 B1 * | 3/2002 | Shinmura et al. ............. 701/48 |
| 6,896,083 B2 * | 5/2005 | Ohtsu .......................... 180/197 |
| 7,011,326 B1 * | 3/2006 | Schroeder et al. .......... 280/444 |
| 7,084,593 B2 * | 8/2006 | Crowley ..................... 318/432 |
| 2001/0032750 A1 * | 10/2001 | Serizawa et al. ........... 180/423 |
| 2002/0125063 A1 * | 9/2002 | Kurishige et al. .......... 180/443 |
| 2002/0179362 A1 * | 12/2002 | Norman et al. ............. 180/446 |
| 2003/0042067 A1 * | 3/2003 | Yanaka ....................... 180/446 |
| 2003/0102181 A1 * | 6/2003 | Tokumoto ................... 180/446 |
| 2003/0125148 A1 * | 7/2003 | Phelan et al. ................. 475/84 |
| 2003/0125160 A1 * | 7/2003 | Holloway ................... 477/110 |
| 2003/0184170 A1 * | 10/2003 | Kurnia et al. ............. 310/68 B |
| 2005/0228568 A1 * | 10/2005 | Hack et al. .................... 701/70 |

\* cited by examiner

*Primary Examiner*—Tuan C To
(74) *Attorney, Agent, or Firm*—Lionel D. Anderson

(57) ABSTRACT

The present invention provides a device for dynamically counteracting torque steer which includes a processor adapted to calculate a correction factor from a calculated axle torque on front wheel drive half shafts of the vehicle. A power circuit is provided responsive to the calculated correction factor to provide an offset current through the power steering unit or the braking system of the vehicle to counteract the torque steer.

11 Claims, 2 Drawing Sheets

CONTROL SYSTEM FOR ACTIVE ATTENUATION OF TORQUE-STEER VIA ELECTRIC POWER STEERING

FIELD OF THE INVENTION

The present invention relates generally to a torque steer correction device, and more particularly, the present invention relates to a torque steer correction device that compensates for torque steer caused by vehicle powertrain torque.

BACKGROUND

Front wheel drive vehicles commonly undergo a phenomenon known as torque steer. Torque steer is a vehicle's desire to turn left or right during acceleration. The causes for torque steer are numerous. However, these causes are rooted in the component architecture of the front wheel drive vehicle.

In front wheel drive vehicles, the power plant which drives the vehicle is operationally engaged to the front wheels. The power plant drives a transaxle which in-turn drives half shafts that extend between the transmission and the vehicle's front wheels. Each half shaft extends from one portion of the transmission to a corresponding wheel. Depending on the lateral and angular location of the transmission with respect to the vehicle, each half shaft commonly has a different length and angle than the other. The difference in length and angle of one half shaft from the other creates a moment arm about the steering axis of the vehicle. As a result, when the vehicle is accelerated, the rotational torque applied to the half shafts causes the vehicle to steer. This effect creates an unintended tendency for the vehicle to steer, which is undesirable for a vehicle driver. Numerous other causes for a vehicle torque steer also exist such as asymmetric tire slip. The present invention was developed in light of these and other drawbacks.

SUMMARY OF THE INVENTION

The present invention addresses these and other drawbacks by providing a device for using the power steering unit to counteract torque steer. The present invention provides a processor that is responsive to vehicle parameters to calculate axle torque at half shafts of the front-wheel drive vehicle. The processor includes a look-up table to associate a correction factor with the calculated torque to determine an amount of torque to be applied by the power steering unit to offset the torque steer. In the case of power steering, a power circuit supplies the required offset current to the power steering unit to dynamically offset the torque through the vehicle. In the case of a differential braking system, the brake system adjusts the individual brakes to offset the torque steer.

In a further aspect, a method is provided for counteracting torque steer which includes reading a plurality of engines parameters, calculating an axle torque at each of the pair of half shafts of a front wheel drive vehicle, determining a correction factor from the calculated axle torque, and applying a counteracting torque by the power steering unit to the steering linkage of the vehicle or with a differential braking system to counteract torque steer.

DETAILED DESCRIPTION OF THE INVENTION

Figure 1:
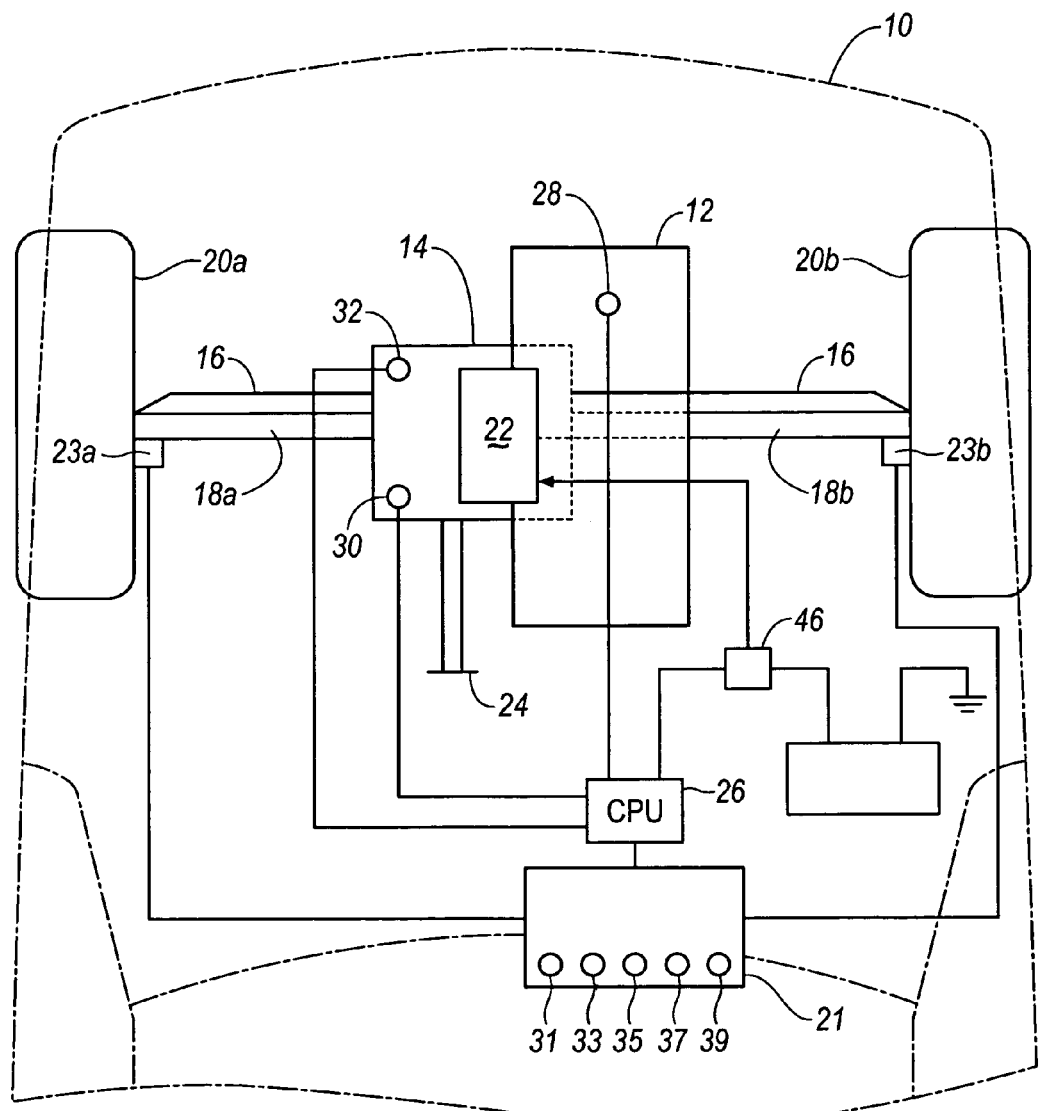
FIG. 1 is a schematic view of a front-wheel drive vehicle with a torque steer correction device according to the present invention.

Referring now to FIG. 1, a vehicle 10 is shown having torque steer attenuation device according to the present invention. Vehicle 10 is a front wheel drive vehicle having an engine 12, transaxle 14, steering linkage 16, half shafts 18A and 18B, wheels 20A and 20B, power steering unit (PSU) 22, steering wheel 24, central processing unit (CPU) 26, and brake system 21 that controls brakes 23A and 23B.

Engine 12 is preferably a gas powered conventional engine which acts as the power plant for the vehicle 10. The energy output of engine 12 is supplied to the transaxle 14 which, in turn, modifies the engine output according to desired torque and speed characteristics by shifting between a plurality of gears. The modified output from transaxle 14 is then supplied to each half shaft 18A and 18B. Half shafts 18A and 18B then supply the rotational output from transaxle 14 to respective wheels 20A and 20B.

Power steering unit (PSU) 22 is an electric motor system which derives its power from either a vehicle battery or the alternator circuitry of vehicle 10 (not shown). The power steering unit PSU 22 is operationally engaged to steering linkage 16 to cause rotation of each wheel 20A and 20B about their steering axes. PSU 22 provides motor assistance to the steering linkage 16 of the vehicle 10 responsive to input from the steering wheel 24 to assist the vehicle driver in turning the vehicle steering wheel.

Figure 2:
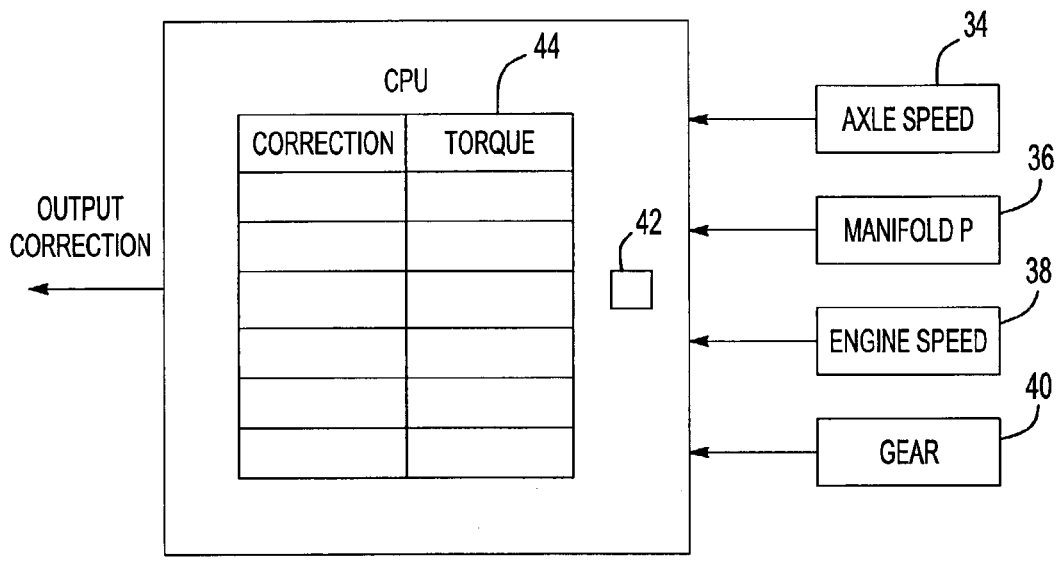
FIG. 2 is a schematic view of a central processing unit utilizing a torque steer correction device according to the present invention.

With continued reference to FIGS. 1 and 2, CPU 26 receives various inputs from vehicle 10 including manifold pressure from manifold pressure sensor 28, engine speed and vehicle speed from sensors 30, and the current gear of transaxle 14 from gear sensor 32. Additionally, CPU 26 preferably receives inputs from conventional differential breaking sensors used in conjunction with a differential braking system, which is sometimes used as a steering system on a vehicle, as is known to one skilled in the art. Specifically, a yaw gyro sensor 31 indicates the rotational velocity or acceleration component of the vehicle, a steering wheel turn angle sensor 33 indicates the turn position of the steering wheel or steering linkage 16, an accelerometer sensor 35 indicates the acceleration of the vehicle, and individual wheel speed sensors 37 indicate the individual wheel speeds of all vehicle wheels.

In a first embodiment, as described with respect to FIG. 2, CPU 26 includes a processor 42 adapted to calculate the output torque on half shafts 20A and 20B supplied from transaxle 14. CPU 26 also includes a look-up table 44 which correlates a plurality of different motor corrections to a respective one of a plurality of correction factors. In the present embodiment, the correction factor is the required torque or some value representative of the required torque for offsetting the torque steer at that respective axle torque. Preferably, look-up table 44 is generated by experimental data whereby the torque steer specific to each given vehicle is determined across a range of output torques. However, the motor correction for the torque steer can also be calculated by the CPU 26, eliminating the lookup table. This calculation uses known design information, such as half-shaft length and other relevant architecture, in combination with the read in parameters from manifold pressure from manifold pressure sensor 28, engine speed and vehicle speed from sensors 30, and the current gear of transaxle 14 from gear sensor 32 to calculate the torque. Additionally, any combination or subcombination of these factors can be used to determine the torque steer. In another instance, the correction factors can be calculated, without use of experimental information, and then listed in a lookup table fashion. Other modifications are also possible without deviating from the scope of the claimed invention.

Power circuit 46 electrically communicates with both CPU 26 and PSU 22. Power circuit 46 outputs a specific current to PSU 22 in response to the motor correction generated from central processing unit 26 in response to the axle torque of look-up table 44.

When a conventional front wheel drive vehicle, such as vehicle 10 accelerates, torque steer causes wheels 20 and steering wheel 24 to turn. The present invention counters this unintended turning by supplying a torque (but not necessarily steering wheel displacement) in the opposite direction to the torque steer with power steering unit 22. This is accomplished by the steps set out in FIG. 3. Here, in step 48, engine parameters such as axle speed 34, manifold pressure 36, engine speed 38, and current gear 40 are read into the processing unit 26. In step 50, the axle torque on half shafts 18A and 18B are calculated in processor 42. However, it is understood that other means of calculating axle torque can be effected and the present invention is not limited to that disclosed herein. For instance, an acceleration sensor can be used in combination with a grade sensor 39 to calculate the desired torque. In another instance, look-up tables can be provided for each of the read parameter to thereby determine the output torque. Moreover, the engine parameters can be directly indexed to the correction factor, bypassing the torque calculation, to determine the output torque. Other similar methods can be used to determine the correction factor.

In step 52, the calculated axle torque is then compared on the look-up table to determine the desired correction factor to offset the torque steer for the given axle torque. When the correction factor is identified for a given axle torque, a signal representative of the correction factor is output to the power circuit 46. Power circuit 46 then routes the appropriate current through PSU 22 to provide the required counter torque to the steering linkage 16 to counteract the torque steer in the steering linkage 16 and wheels 20A and 20B in step 54.

In another aspect of the present invention, a conventional differential braking system is used to offset the torque steer of the vehicle. As is known in the art, differential braking systems utilize the application of pressure on each independent brake, such as any one of brakes 23A and 23B as well as the not shown rear brakes, to control the yaw or turning behavior of the vehicle. Accordingly, with reference to FIG. 2, the correction factors are representative of a correction signal sent to the braking system 21 to adjust pressure to brakes 23A and 23B to offset the calculated torque steer.

Figure 3:
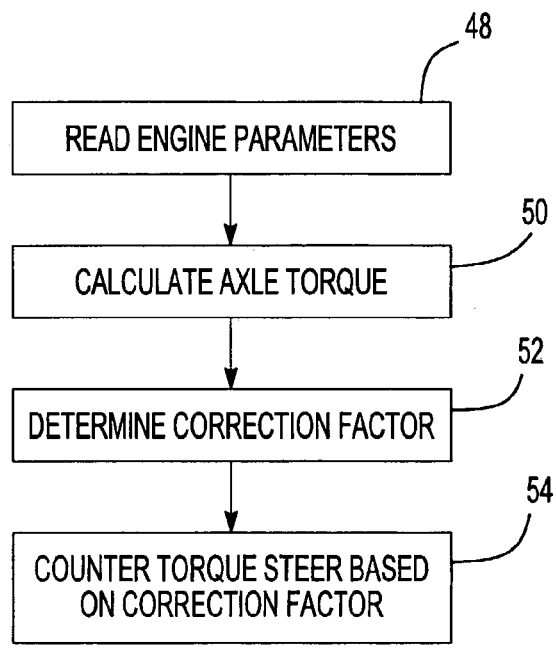
FIG. 3 is a flow chart depicting the operation of a torque steer correction device according to the present invention.

The operation of the preferred embodiment is described with continued reference to FIG. 3. In step 48, the engine parameters such as axle speed 34, manifold pressure 36, engine speed 38, and current gear 40 are read into the processing unit 26 for calculation of different axle torque. Additionally, information from yaw gyro sensor 31, steering wheel turn angle sensor 33, accelerometer sensor 35, and individual wheel speed sensors 37 are read in for operation of the differential braking system. In step 50, the axle torque on half shafts 18A and 18B are calculated in processor 42. As in the previous embodiment, it is understood that other means of calculating axle torque can be effectuated and the present invention is not limited to that disclosed herein. In step 52, the calculated axle torque is then compared on the look-up table 44 to determine the desired correction factor to offset the torque steer for the given axle torque. When the correction factor is identified for a given axle torque, a signal representative of the correction factor is output to the braking system 21 to apply pressure to brakes 23A and 23B as well as the remaining brakes, if needed, to offset the torque steer of the vehicle in step 54.

The invention claimed is:

1. A device for counteracting torque steer of a vehicle, comprising:
    a plurality of vehicle sensors each associated with a measurable vehicle parameter;
    half shafts that provide output torque; and
    a processor programmed to accept data associated with predefined vehicle architectural design parameters and data associated with one or more measured vehicle parameters from said vehicle sensors, wherein the data associated with vehicle architectural design parameters include
      a first length of a first half shaft; and
      a second length of a second half shaft;
    wherein said data associated with predefined vehicle architectural design parameters and said data associated with one or more measured vehicle parameters from the vehicle sensors are acted upon by said processor,
    wherein said processor calculates an output torque quantity to apply to said half shafts to offset torque steering.

2. The device according to claim 1, wherein the plurality of vehicle sensors include
    a manifold pressure sensor,
    an engine and vehicle speed sensor, and
    a gear sensor, wherein the plurality of vehicle sensors are associated with a power steering unit.

3. The device according to claim 1, wherein the plurality of vehicle sensors include
    a yaw gyro sensor,
    a steering wheel turn angle sensor,
    an accelerometer sensor,
    a plurality of individual wheel sensors, and
    a grade sensor, wherein the plurality of vehicle sensors are associated with a differential brake system.

4. A device for counteracting torque steer of a vehicle, comprising:
    a plurality of vehicle sensors each associated with a measurable vehicle parameter;
    a processor programmed to calculate output torque on half shafts to offset torque steering by combining
      data associated with predefined vehicle architectural design parameters, and
      data associated with one or more measured vehicle parameters from the vehicle sensors,
    wherein the data associated with vehicle architectural parameters include
      a first length of a first half shaft, and
      a second length of a second half shaft.

5. The device according to claim 4, wherein the, plurality of vehicle sensors include
    a manifold pressure sensor,
    an engine and vehicle speed sensor, and
    a gear sensor, wherein the plurality of vehicle sensors are associated with a power steering unit.

6. The device according to claim 4, wherein the plurality of vehicle sensors include a yaw gyro sensor, a steering wheel turn angle sensor, an accelerometer sensor, a plurality of individual wheel sensors, and a grade sensor, wherein the plurality of vehicle sensors are associated with a differential brake system.

7. A device for counteracting torque steer of a vehicle, comprising:

a plurality of vehicle sensors each associated with a measurable vehicle parameter;

half shafts that provide output torque; and a processor programmed to accept data associated with predefined vehicle architectural design parameters and data associated with one or more measured vehicle parameters from said vehicle sensors, wherein the data associated with vehicle architectural parameters include a first length of a first half shaft, and a second length of a second half shaft.

8. The device according to claim 7, wherein said data associated with predefined vehicle architectural design parameters and said data associated with one or more measured vehicle parameters from the vehicle sensors are acted upon by said processor.

9. The device according to claim 8 wherein said processor calculates a quantity to apply to said half shafts to offset torque steering.

10. The device according to claim 7, wherein the plurality of vehicle sensors include a manifold pressure sensor, an engine and vehicle speed sensor, and a gear sensor, wherein the plurality of vehicle sensors are associated with a power steering unit.

11. The device according to claim 7, wherein the plurality of vehicle sensors include a yaw gyro sensor, a steering wheel turn angle sensor, an accelerometer sensor, a plurality of individual wheel sensors, and a grade sensor, wherein the plurality of vehicle sensors are associated with a differential brake system.

* * * * *